United States Patent [19]
Hetzler et al.

[11] Patent Number: 5,757,567
[45] Date of Patent: May 26, 1998

[54] METHOD AND APPARATUS FOR SERVO CONTROL WITH HIGH EFFICIENCY GRAY CODE FOR SERVO TRACK ID

[75] Inventors: Steven Robert Hetzler, Sunnyvale; Louis Joseph Serrano, San Jose, both of Calif.

[73] Assignee: International Business Machines Corporation, Armonk, N.Y.

[21] Appl. No.: 598,486

[22] Filed: Feb. 8, 1996

[51] Int. Cl.⁶ .................................................. G11B 5/09
[52] U.S. Cl. ................................. 360/49; 360/78.14
[58] Field of Search .................. 360/78.14, 48, 360/49

[56] References Cited

U.S. PATENT DOCUMENTS

| | | | |
|---|---|---|---|
| 4,151,571 | 4/1979 | Cardot et al. | 360/77 |
| 4,195,320 | 3/1980 | Andresen | 360/135 X |
| 4,984,100 | 1/1991 | Takayama et al. | 360/49 |
| 5,270,878 | 12/1993 | Kaida et al. | 360/77.02 X |
| 5,274,510 | 12/1993 | Sugita et al. | 360/78.14 X |
| 5,384,671 | 1/1995 | Fisher | 360/78.14 X |

FOREIGN PATENT DOCUMENTS

| | | | |
|---|---|---|---|
| 0 459 265 A2 | 12/1991 | European Pat. Off. | G11B 5/596 |
| 91-168927 | 7/1991 | Japan | G11B 7/007 |
| 91-259472 | 11/1991 | Japan | G11B 21/10 |
| 93-114242 | 5/1993 | Japan | G11B 20/12 |

OTHER PUBLICATIONS

D. H. Pennington, "Dicell Gray Coding of Disk File Track Addresses", IBM Technical Disclosure Bulletin, vol. 25, No. 2, pp. 776–777, Jul. 1982.

M. Kisaka, et al., "Improved Gray Code Pattern on a Hard Disk", IBM Technical Disclosure Bulletin, vol. 35, No. 4B, pp. 373–374, Sep. 1992.

H. E. Korth, "Sectored Servo Headers for Optical Storage Devices", IBM Technical Disclosure Bulletin, vol. 31, vol. 10, pp. 256–257, Mar. 1989.

Primary Examiner—Andrew L. Sniezek
Attorney, Agent, or Firm—Baker Maxham Jester & Meador

[57] ABSTRACT

A gray code is provided for use with disk servo track identification encodement that preserves the gray code property of only a single digit changing state between two numbers in the code sequence and also preserves magnetization between code numbers while only requiring a single bit for encoding each code value by recording a single pad bit before the gray code bits. By proper selection of the sign of the pad bit and the gray code numbering sequence, the gray code encodement scheme uses n+1 code bits for an n-bit gray code. The efficiency of the gray code encodement can be enhanced by splitting the track identification number to be recorded into multiple fields and then recording only the low order bits sufficient to identify a track within the maximum estimated error of the servo head on every track and otherwise alternating the high and low middle order bit fields with the low order bit field. A run-length limiting feature also can be provided. One way is for the encoded bits to be broken into fields so that only two are written in each sector. The two fields are concatenated and encoded so that the length of the field is shorter than the run-length limit. Alternatively, the code sequence can be obtained as a subsequence of a larger sequence. This subsequence then obeys the run-length limit.

12 Claims, 6 Drawing Sheets

| Track Number | Binary 3210 | Gray 3210 | Gray Number-Signal Code | | |
|---|---|---|---|---|---|
| | | | Code L3210 | Transitions L 3 2 1 0 | Signal L 3 2 1 0 |
| 0 | 0000 | 0000 | 10000 | → ← ← ← ← | |
| 1 | 0001 | 0001 | 01000 | → → ← ← ← | |
| 2 | 0010 | 0011 | 01001 | → → → ← → | |
| 3 | 0011 | 0010 | 10001 | → ← ← ← → | |
| 4 | 0100 | 0110 | 00101 | → → → ← → | |
| 5 | 0101 | 0111 | 11101 | → ← → ← → | |
| 6 | 0110 | 0101 | 11100 | → ← → ← ← | |
| 7 | 0111 | 0100 | 00100 | → → → ← ← | |
| 8 | 1000 | 1100 | 00110 | → → → ← ← | |
| 9 | 1001 | 1101 | 11110 | → ← → ← → | |
| 10 | 1010 | 1111 | 11111 | → ← → ← → | |
| 11 | 1011 | 1110 | 00111 | → → → ← ← | |
| 12 | 1100 | 1010 | 10011 | → ← ← ← ← | |
| 13 | 1101 | 1011 | 01011 | → → ← ← → | |
| 14 | 1110 | 1001 | 01010 | → → ← → ← | |
| 15 | 1111 | 1000 | 10010 | → ← ← → ← | |

| Track Number | Gray Number-Signal Code | | |
|---|---|---|---|
| | Code L3210P | Transitions L 3 2 1 0 P | Signal L 3 2 1 0 P |
| 0 | 100001 | | |
| 1 | 010001 | | |
| 2 | 010010 | | |
| 3 | 100010 | | |
| 4 | 001010 | | |
| 5 | 111010 | | |
| 6 | 111001 | | |
| 7 | 001001 | | |
| 8 | 001100 | | |
| 9 | 111100 | | |
| 10 | 111111 | | |
| 11 | 001111 | | |
| 12 | 100111 | | |
| 13 | 010111 | | |
| 14 | 010100 | | |
| 15 | 100100 | | |

METHOD AND APPARATUS FOR SERVO CONTROL WITH HIGH EFFICIENCY GRAY CODE FOR SERVO TRACK ID

BACKGROUND OF THE INVENTION

1. Field of the Invention

This invention relates generally to data storage device servo control systems and, more particularly, to demodulation of servo track identification information to determine the location of a read/write head relative to disk tracks.

2. Description of the Related Art

In conventional computer data storage systems having a rotating storage medium, such as a magnetic or magneto-optical disk, data is stored in a series of concentric or spiral tracks across the surface of the disk. The data comprises a series of variations in disk surface magnetic orientation recorded laterally in the tracks. A magnetic read/write head suspended over the disk surface transduces the variations in magnetic orientation and produces a readback signal. The variations in magnetic orientation, generally comprising reversals of magnetic flux, represent binary digits of ones and zeroes that in turn represent data. The magnetic read/write head detects the variations in magnetic orientation and generates the readback signal as the disk rotates relative to the read/write head at thousands of revolutions per minute.

Reading and recording data in a desired one of the tracks requires knowledge of the track over which the read/write head is positioned and requires precise centering of the read/write head over the track as the disk rotates. Conventionally, the read/write head is mounted on a disk arm that is moved by a servo. A disk drive servo control system controls movement of the arm radially across the disk to move the read/write head from track to track in a seek operation and, once over a selected track, to maintain the head in a path centered over the track in a track-following operation.

A servo control system moves the read/write head to a desired track and maintains the head centered over a track by reading servo information from the disk surface. The servo information comprises a pattern of high-frequency magnetic flux transitions, generally flux reversals, that are pre-recorded in the tracks at the time of disk manufacture. A servo read head, which can be either the same head used for reading the binary data or can be a dedicated servo head, transduces the servo information and produces a servo signal.

There are a variety of methods for providing servo information to a disk servo control system. In a method referred to as the dedicated servo method, the entire surface of one disk is provided with servo information. A servo magnetic head is positioned over the dedicated servo disk surface in a fixed relationship relative to one or more data read/write heads positioned over other data disk surfaces. The position of the servo head is used to indicate the position of the data read/write heads. The dedicated servo method is most often used with multiple disk systems, because a dedicated servo system for a single disk application would use one-half of the available disk surface area for servo information and therefore would not be especially efficient.

Another method of providing servo information is known as the sector servo method. In the sector servo method, each disk surface includes servo information and binary data within a single track. The tracks on a sector servo disk surface are divided into radial sectors having a short servo information field followed by a data field. The servo information field includes a sector marker, which indicates to the read/write head that servo information immediately follows in the track, a track identification number, and a high-frequency servo burst pattern. The sector servo method is more efficient than the dedicated servo method for low-profile disk drives with fewer disks in the configuration, because a single read/write head can be used to obtain the servo information and to read and record data from the disk and also because less of the total disk surface area is used for servo information. The remaining description assumes a sector servo system, but it will be clear without further explanation to those skilled in the art how the description can be applied to dedicated servo systems.

The portion of the servo information comprising the track identification number is typically recorded as digital information and the portion comprising the servo burst pattern is typically recorded as analog information. That is, the magnetic flux transitions comprising the track number define a binary value, while the servo burst pattern produces an analog position error signal (PES), the magnitude of which indicates the position of the read/write head relative to the track centerline. The servo control system includes demodulation circuitry to distinguish between the two portions of the servo signal.

Because the PES indicates position of the servo head within a single track, the PES provides a fine position control for the disk arm servo. To provide such fine position control, the PES servo burst pattern typically repeats every few tracks, which limits its effectiveness in determining absolute track location on the disk. In contrast, the digital encodement of the track identification number indicates servo head position within an absolute track location of plus or minus one track and therefore provides coarse disk arm position control.

The coarse disk arm position information is useful during a seek operation, when the servo head is travelling too fast to demodulate the PES pattern or when the servo head position is otherwise known only to within the repetition of the PES pattern cycle and not in absolute track terms. The digital encodement of the track identification number also permits additional information to be encoded as well, such as the head number and sector number. Such information is collectively referred to as the track ID information.

Sector servo disk drives typically encode the track identification number using what is known as a gray code. A gray code provides a sequence of binary numbers in which only one digit changes state from one code value to the next. For example, in a conventional 3-bit binary representation, the binary code representation from the number three to the number four changes from "011" to "100", comprising a state change in each of the three digits. That is, the first most significant bit (counting digits from the left) changes state from zero to one while the second and third digits change state from one to zero. A gray code maps each binary number to a binary representation such that only one bit changes state for each number in the sequence.

An example of a typical 3-bit gray code is provided in the following table:

TABLE 1

Binary-to-gray-code mapping.

| Binary number | Gray code equivalent |
| --- | --- |
| 000 | 000 |
| 001 | 001 |
| 010 | 011 |
| 011 | 010 |
| 100 | 110 |
| 101 | 111 |
| 110 | 101 |
| 111 | 100 |

Those skilled in the art should be able to complete the code table, using the rule that the next sequential gray code numerical state is reached by changing the least significant bit that produces a new numerical state. From the table, it should be clear that only one digit changes value at a time. Thus, the change in the gray code equivalent from the binary number three to the binary number four involves a change only to the first most significant bit ("010" to "110").

Gray code numbering schemes are advantageous in servo track identification encodement because the track identification number representation for adjacent tracks will be guaranteed to differ by only one bit. Thus, if the servo control system attempts to decode the track identification number while the head is located between two tracks, the number decoded by the system will be off the true number by at most one track.

For a given clock window for demodulating the servo information, a binary one is represented by a magnetic flux transition (from negative to positive or from positive to negative) and a binary zero is represented by the absence of a transition. To preserve the magnetization sequence from track to track, all the non-changing gray code bits that precede the final transition must preserve their magnetic state from one code word to the next code word. If this condition is not satisfied, then when the servo read head is positioned between two gray code words of adjacent tracks, the code bits that change state can interfere with each other and indicate erroneous track numbers that are off by more than one.

The problem is illustrated in Table 2, which lists three gray code values from Table 1 above and shows the associated magnetic transition pattern with arrowheads indicating the direction of magnetization and representations of the associated electrical readback signal component produced by the read head:

TABLE 2

Numbers and transition patterns.

| Track No. | Binary | Conventional Gray code | Transitions | Signal |
| --- | --- | --- | --- | --- |
| 4 | 100 | 110 | → ← → → | |
| 5 | 101 | 111 | → ← → ← | |
| 6 | 110 | 101 | → ← ← → | |

Thus, the gray code word for track number four is "110" and has a sequence of magnetic flux transitions that are negative (facing each other), positive (facing away), and none (no change in magnetizations). The gray code word for track number five is "111" and has a sequence of transitions that are negative, positive, and negative. Finally, the gray code word for track number six is "101" and has a sequence of transitions that are negative, none, and positive.

From Table 2, it can be seen that the change from track number four to track number five involves a change only to the value of the third bit in the gray code and a corresponding change in the third readback signal component. In contrast, the change from track number five to track number six involves a change in the second bit but a more complicated change to the readback signal component. In particular, when the second bit changes from a one to a zero in the gray code, the associated transition in the readback signal must be removed (a zero is indicated by the absence of a transition). Removing the transition of the second bit results in reversing the sign of the transition for the third bit, switching the third bit from a negative peak to a positive peak.

In the change from track number five to track number six, if the servo read head is between the code words for tracks five and six, it would observe both the second and third (signal) bits changing value. At the half-way point, the second bit would be changing from positive to zero and would have a one-half amplitude value while the third bit would be simultaneously changing from negative to positive on half the head and positive to negative on the other half, so that the third bit would have a net zero value. Therefore, the value would be read as "100" or "110", which are track numbers seven and four, respectively. Thus, this sequence does not provide a gray code, in terms of the signal value changes from one number to another.

Typically, a gray code for track identification encodement is implemented with each code bit requiring two flux transitions. Using two flux transitions to encode a bit preserves the magnetization sequence of the signals from the respective binary digits between tracks. Two of the two-transition techniques used for preserving the signal magnetization between tracks are known as the dibit scheme and the Pennington or pulse position modulation scheme. The dibit scheme encodes a zero as "00" and a one as "11", thereby preserving the magnetization between tracks. The Pennington scheme encodes zero as "01" and a one as "10", achieving the same preservation of magnetization. Unfortunately, each of these two schemes requires two flux transitions per encoded bit. Thus, for an n-bit gray code, these schemes require 2 n flux transitions, and are rate one-half codes. The efficiency of such encoding cannot be greater than 50%.

It would be advantageous to encode track identification data using a gray code that reduces error when reading track ID information between tracks but that has greater information efficiency than currently obtainable from conventional two-transition gray code schemes. The present invention provides such improvements.

SUMMARY OF THE INVENTION

In accordance with the invention, a gray code is provided for use with disk servo track identification encodement that preserves the gray code property of only a single bit changing state between any two numbers in the code sequence and also preserves necessary state transition polarity between code numbers while only requiring a single transition for encoding each code bit. The gray code encodement scheme uses a single pad bit recorded before the gray code bits. By proper selection of the sign of the pad bit and the gray code numbering sequence, the gray code performance for both numbers and signal values can be obtained without using two transitions per bit. More particularly, the gray code encodement scheme in accordance with the invention uses n+1 transitions for an n-bit gray code. In this way, track identification decoding with reduced error limits provided with gray codes is obtained and code efficiency is improved. The invention can be applied to a variety of data storage systems that utilize state transition polarity to represent data, such as magnetic disks and magneto-optical storage systems.

In one aspect of the invention, the efficiency of the gray code encodement in accordance with the present invention in a magnetic disk is improved by splitting the track identification number to be recorded into multiple fields and then recording only the low order bits sufficient to identify a track within the maximum estimated error of the servo head during a seek operation and otherwise alternate the high and middle order bit fields from sector to sector. To obtain the complete track identification number, it is necessary to read two servo fields.

In another aspect of the invention, the gray code encodement scheme in accordance with the invention in a magnetic disk incorporates a run-length limiting feature in which the leading bit and trailing bit of the gray code are selected to limit the number of zeroes that can occur to equal the number of code bits. The encoded bits are then broken into fields having a number of digits equal to the maximum desired length such that each field is generated from a subsequence of a larger-bit gray code constructed in accordance with the invention. The bit fields are then concatenated to obtain the desired number.

Other features and advantages of the present invention should be apparent from the following description of the preferred embodiment, which illustrates, by way of example, the principles of the invention.

DESCRIPTION OF THE PREFERRED EMBODIMENT

Figure 1:
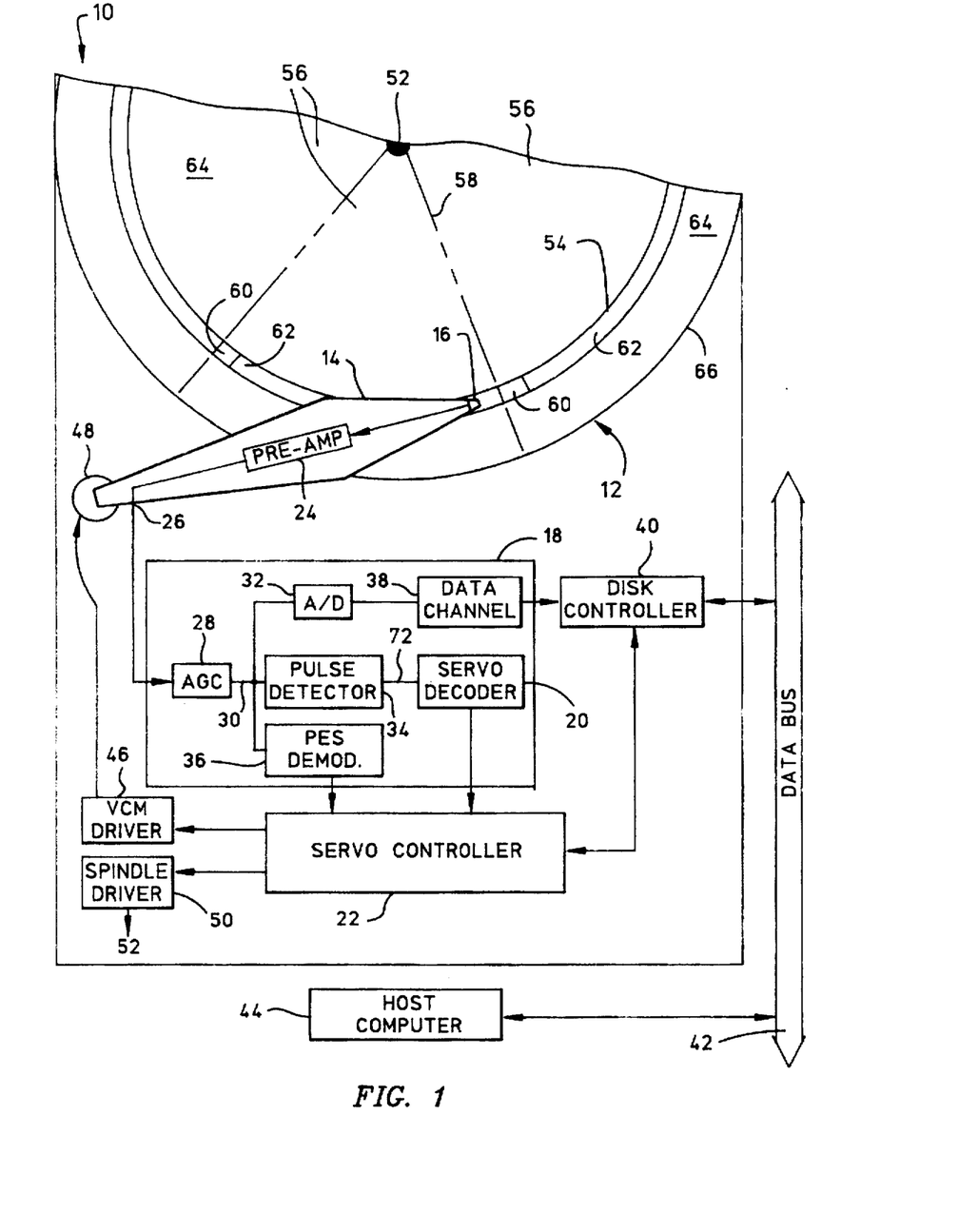
FIG. 1 is a schematic representation and block diagram of a disk drive and servo control system constructed in accordance with the present invention.

FIG. 1 illustrates a sector servo magnetic disk drive 10 constructed in accordance with the present invention. The disk drive includes a disk 12 that is rotated and a disk arm 14 that is moved radially across the disk. User data is read and recorded from the disk 12 as a sequence of transitions by a read/write head 16. A channel chip 18 contains digital detection and decoding circuitry that receives a readback signal from the head 16 and detects servo information and recorded data values in the readback signal. The channel chip 18 includes a servo decoder 20 that receives the servo information and decodes it to produce a track identification number that corresponds to the disk track over which the head 16 is actually located. The servo decoder provides the track identification number to a servo controller 22, which controls movement of the disk arm 14. In accordance with the present invention, the track identification number is recorded on the disk 12 according to a gray code encodement scheme wherein a single pad bit is recorded before the gray code number, which is encoded with a single flux transition per gray code bit such that both the gray code bit and the corresponding readback signal values for any two consecutive numbers (corresponding to adjacent disk tracks) differ by only a single change in value. In this way, both gray code numbers and their corresponding signal values are obtained with only one flux transition per bit and with preservation of the magnetization polarity between tracks, where necessary.

In the preferred embodiment, the readback signal produced by the read/write head 16 is provided to a pre-amplifier 24 mounted on the servo arm 14. The pre-amplifier amplifies the servo signal and provides the amplified signal over a pre-amplifier output line 26 to the channel chip 18. In the channel chip, the servo signal is received at an automatic gain control (AGC) circuit 28 that adjusts the gain applied to the servo signal to maintain the signal amplitude within a range that is predetermined to simplify information processing, reduce noise, and improve system linearity. The amplified signal from the AGC circuit is provided over an AGC output line 30 to an analog-to-digital (A/D) converter 32, a pulse detector 34, and a PES demodulator 36.

The A/D converter 32 converts the analog amplified signal to digital values and provides them to a data channel circuit 38, which processes the digital values and reproduces the user data recorded in tracks on the disk 12 and provides the data to a disk controller 40. From the disk controller, the user data is provided to a data bus 42, where they are received by a host computer processor 44 and retrieved by the computer user. The pulse detector 34 receives the output from the AGC circuit 28 and provides a pulse signal to the servo decoder 20, which produces the disk track identification number and provides it to the servo controller 22. The PES demodulator 36 receives the AGC output and produces a position error signal (PES) that it provides to the servo controller. The servo controller uses the track identification number to move the head to a desired track in a track seek operation and uses the PES to maintain the head centered over a track in a track following operation.

The disk controller 40 receives requests for reading and recording data on the disk from the host computer 44 and thereby determines a desired disk track number at which to position the read/write head 16. The disk controller generates control signals for the desired track and provides them to the servo controller 22. To control movement of the disk arm 14 radially across the disk, during track seek and track following, the servo controller provides servo signals to a VCM driver 46. The VCM driver generates servo control signals to control a voice controlled motor (VCM) servo 48 that moves the disk arm 14. The servo controller also provides drive signals to a spindle motor driver 50, which generates spindle control signals to control a drive motor 52 that controls rotation of the disk 12.

The servo information read by the read/write head 16 is recorded in tracks across the disk 12. In FIG. 1, a pair of concentric circular lines designates a single servo track 54 of the disk. Only one servo track is shown in FIG. 1 for simplicity of illustration. A single servo track can include several repeated cycles of a servo pattern and can encompass multiple tracks of user data or fractions of tracks of user data. FIG. 1 diagrammatically shows that the disk 12 is divided into sectors 56, whose boundaries are represented in the illustration by dashed radial lines 58. FIG. 1 also shows that each track 54 includes a servo information field 60 followed by a data field 62. The analog readback signal generated by the read/write head 16 when it reads the track 54 comprises servo information when the head is over a servo information field 60 and comprises data channel information when the head is over a data field 62.

Those skilled in the art will understand that the disk 12 comprises a magnetic storage medium 64 deposited on a substrate 66. It should be understood that the preferred embodiment will be described with reference to the sector servo system illustrated in FIG. 1 but that the teachings of the present invention apply equally well to dedicated servo systems and other storage systems using servo-controlled heads, such as capacitive and optical sensing disk storage systems. Such alternative systems have heads that detect electrical or optical transitions to generate a readback signal. As the disk 12 of FIG. 1 is rotated relative to the magnetic read/write head 16, the head transduces the information recorded in the disk tracks. That is, the head 16 reads servo information recorded in the magnetic storage medium 64 at the time of disk manufacture by detecting changes in magnetic flux and generating appropriate readback signals.

Figure 2:
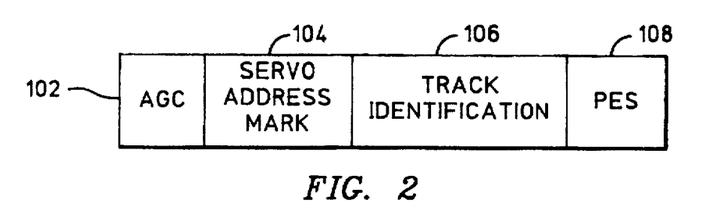
FIG. 2 is a representation of the servo information field data structures recorded on the disk illustrated in FIG. 1.

FIG. 2 is a representation of the information contained in a servo information field 60 of the disk 12 illustrated in FIG. 1. An initial section of the servo information field contains an automatic gain control (AGC) block 102 that contains synchronizing information for the AGC block 28. The next section of the servo information field comprises a servo address mark field 104 that is used by the channel chip 18 for timing purposes. The next section of the servo information field is a track identification field 106 that contains the gray number-signal code in accordance with the present invention. The final section of the servo information field comprises a PES field 108 that contains the information from which the PES value is derived.

Figure 3:
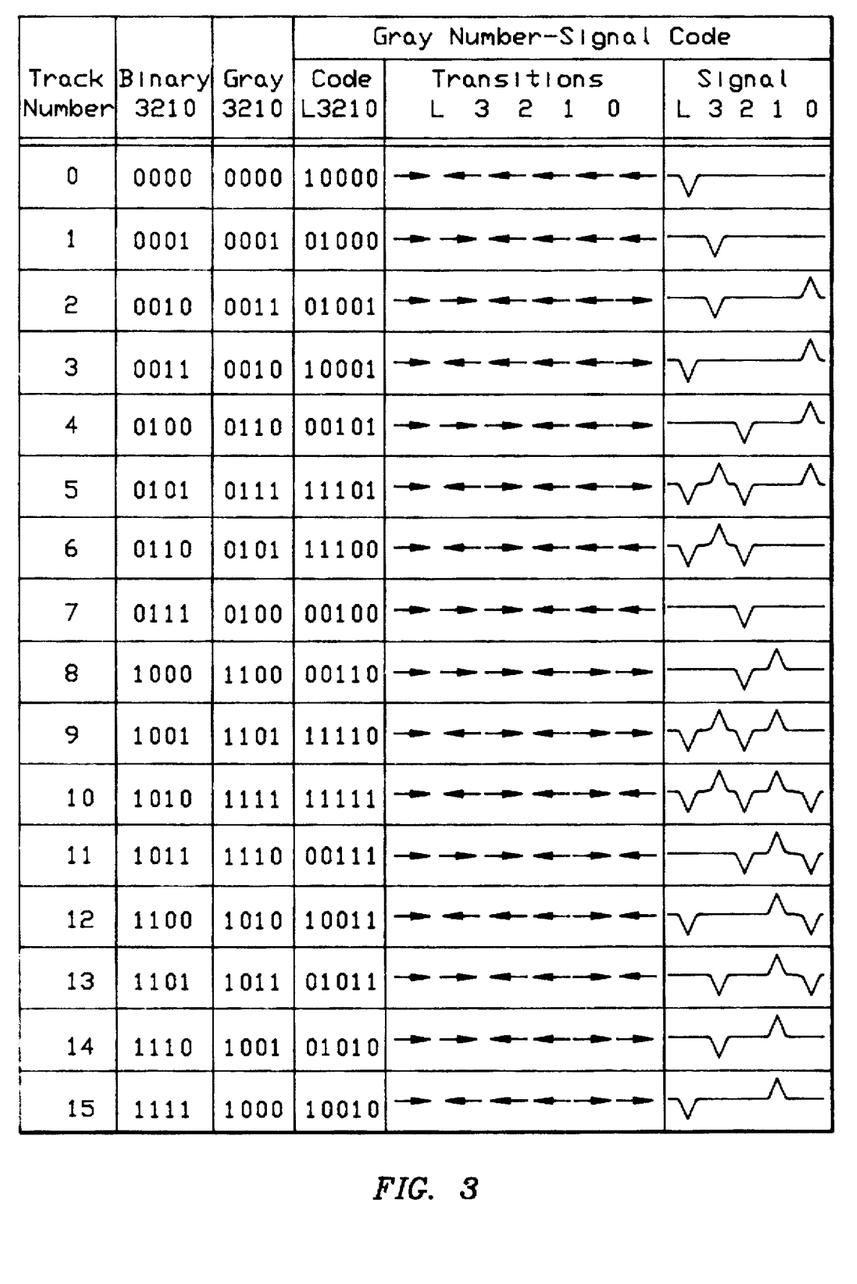
FIG. 3 is a table of particular track identification numbers and corresponding encoded values and observed signals as read from the disk 12 and decoded by the servo decoder 70 illustrated in FIG. 1.

FIG. 3 is a table that illustrates the track identification number encodement scheme in accordance with the present invention. The FIG. 3 table includes major columns labeled Track Number, Binary, Gray, and Gray Number-Signal Code. The "Track Number" column corresponds to the track identification number encoded in the servo information fields 60 of the disk 12 illustrated in FIG. 1. The "Binary" column contains the binary numerical equivalent of the track identification number. The "Gray" column contains a conventional gray code equivalent of the binary numerical equivalent. The "Binary" and "Gray" columns both contain subheadings "3", "2", "1", and "0" that indicate bit numbers. The "Gray Number-Signal Code" column is comprised of three minor columns labeled Code, Transitions, and Signal, respectively. The "Code" column contains the binary track number as encoded onto the disk 12 in accordance with the principles of the present invention. The subheadings in the "Code" column label each bit: "L" is the leading pad bit, "3", "2", "1", and "0" are the code bits, with "0" being the least significant and "3" being the most significant. The "Transitions" column contains a polarity representation of the magnetic flux transitions recorded in the servo information field 60 that correspond to the entry in the "Code" column. The subheadings in the "Transitions" column label the individual transitions which correspond to the bits in the "Code" column. The polarity prior to the code is shown as the left-most arrow. The "Signal" column is a representation of the electrical signal produced by the head 16 of the disk drive 10 when it reads the encoded track identification number. The subheadings in the column label the individual signal values that correspond to the bits in the "Code" column. The number encodement in accordance with the invention is referred to as a gray number-signal code to emphasize that both the numerical bits and the resulting electrical signal exhibit the gray code property of only a single change in value between any two sequential code numbers.

In the preferred embodiment, the encodement scheme in accordance with the present invention makes use of a leading pad bit whose magnetic polarity is controlled to provide the desired properties. In the FIG. 3 table, the leading pad bit is indicated by the subheading "L" in the "Code", "Transitions", and "Signal" columns. In the "Code" column, the leading pad bit is shown as a 1 when there is a corresponding transition in the "Transition" column, and as a 0 when there is no such transition. Those skilled in the art will appreciate that the encoding rules for producing a conventional gray code sequence can be expressed as, beginning with a state of all zeros, reaching the next sequential numerical state by changing the least significant bit that produces a new numerical state. Inspection of the FIG. 3 table "Gray Code" column should confirm that the entries follow these rules.

In FIG. 3, for example, in the conventional gray code the change from track number zero to track number one comprises changing bit 0, the least significant bit. Similarly, the change from track number one to track number two comprises changing bit 1. In the case of the change from track number one to track number two, bit 0 cannot be changed because that would produce the prior numerical state corresponding to track number zero. In contrast, the change from track number two to track number three in the gray code can be obtained by changing bit 0, because a new numerical state is thereby produced. The remaining entries in the gray code column are produced similarly and require no further explanation.

It should be understood that the present invention is intended for application with track identification numbers of greater than two bits only. That is, trivial cases of 1-bit and 2-bit conventional gray codes do not suffer from the between-track transition difficulties described above in the Background of the Invention section. Thus, the invention is useful for generating gray number-signal codes of three or more bits.

The encoding rules for the gray number-signal code in accordance with the present invention can be expressed as follows:

A zero may be changed to a one if no lesser significant bit is a one.

A one may be changed to a zero if no lesser significant bit is a one.

A zero may be changed to a one if no greater significant bit is a one; the sign of the leading pad bit is then reversed.

A one may be changed to a zero if no greater significant bit is a one; the sign of the leading pad bit is reversed.

A code produced from these rules will have only one magnetic flux transition per logical bit and will maintain the magnetic polarity alignment of the code words where necessary. For magnetic recording, a zero bit indicates that no transition is recorded in the bit location, and a one indicates that a transition is recorded in the bit location. In the rules, the first bit following the leading pad bit is termed the most significant bit, and the last bit is termed the least significant bit. The first rule permits a transition to be recorded in a bit location if there are no transitions in the following bit locations, because there is no need to preserve polarity. The second rule permits a transition to be removed from a bit location if there are no transitions in the following bit locations, because there is no need to preserve polarity. The third rule permits a transition to be recorded in a bit location if there are no transitions in the preceding bit locations, and reverses the sign of the leading pad bit. Similarly, the fourth rule permits a transition to be removed from a bit location if there are no transitions in the preceding bit locations, and reverses the sign of the leading pad bit.

To produce the code, the sign of a leading pad bit must be controlled to preserve the states of existing transitions when the leading bit is changed in accordance with the rules listed above. The sign of the leading pad bit may be controlled by having a fixed magnetic polarity prior to the pad bit. The sign (polarity) may be reversed by writing a transition in the pad bit location. It may be preserved by not writing a transition in the pad bit location. This is illustrated in the table in FIG. 3. Control of the leading pad bit is necessary because a change in the polarity of the leading transition would reverse the polarity of all following transitions in a number. Therefore, the leading pad bit is not decoded and therefore can be used to control the polarity of the first transition, in accordance with the last two rules listed above. Thus, there is never an instance where more than one of the transitions in the gray number-signal code is changing simultaneously, except for the leading pad bit which is not decoded. The sign of the leading pad bit (the presence or absence of a transition in the pad bit location) for the first number in the sequence may be selected according to design preference. In FIG. 3 it has been chosen to have a transition for track number 0. Also, because track number zero has no code transitions, the next track number is created by adding a single transition, and that bit location may be treated using either rule 1 or rule 3 above. It should be noted that the code closes on itself, because the last code word for track number fifteen can transition to the code word for track number zero (note the respective entries in the "Code" column and the "Signal" column of FIG. 3).

The 4-bit gray number-signal code illustrated in the table of FIG. 3 shows just one example of a code constructed in accordance with the present invention. Code 1 below is the code from FIG. 3. Four other 4-bit codes that exhibit the properties described above in terms of changing bits and signal components are provided below. The lists of numbers are the binary values of the code bits, not including the leading pad:

TABLE 3

| 4-bit Gray number-signal codes. | |
| --- | --- |
| Code 1: | 0 8 9 1 5 13 12 4 6 14 15 7 3 11 10 2 |
| Code 2: | 0 8 9 1 3 11 10 2 6 7 15 14 12 13 5 4 |
| Code 3: | 0 1 8 9 10 11 3 2 6 7 15 14 12 13 5 4 |
| Code 4: | 0 1 9 8 12 13 5 4 6 14 15 7 3 11 10 2 |
| Code 5: | 0 2 3 11 10 8 9 1 5 13 12 14 15 7 6 4 |

Figure 4:
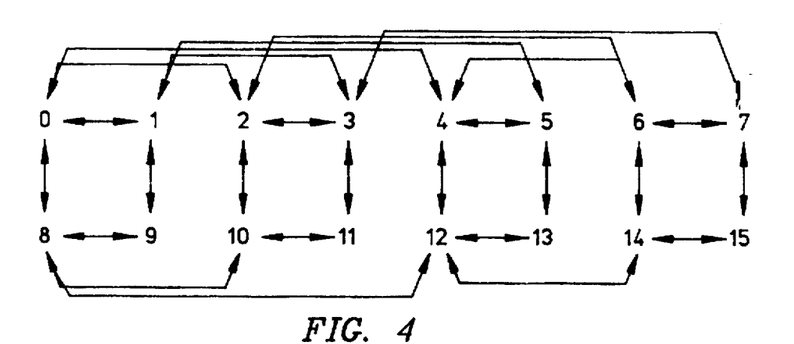
FIG. 4 is a state diagram that produces the 4-bit gray number-signal code illustrated in FIG. 3.

A 4-bit code generation state diagram that produces sequences exhibiting the properties described above can be constructed and is shown in FIG. 4. The FIG. 4 state diagram illustrates the allowed transitions for consecutive numbers in the encodement scheme. Thus, a 4-bit code can be constructed by following a path on the state diagram that visits each node at most once. Typically, a code visits each node exactly once and closes on itself. A 4-bit code produced from the encoding rules listed above and in accordance with the FIG. 4 state diagram will have only one magnetic transition per logical bit and will maintain the magnetic alignment of the code words.

It can be seen that the gray number-signal code resembles a conventional gray code with bit orders transposed. That is, for the code illustrated in FIG. 3, the relationship between the numbers of the gray code $G_n$ and the numbers of the gray signal-number code $A_n$ is given by the following equations:

$$A_3=G_0;$$

$$A_2=G_2;$$

$$A_1=G_3; \text{ and}$$

$$A_0=G_1.$$

Where the n-bit gray code sequence is generated by the equations:

$$G_m = B_m \oplus B_{m+1} \text{ for } 0 \leq m < n-1;$$

$$G_m = B_m \text{ for } m=n$$

where $B_m$ is the mth binary bit to be encoded. The first $G_m$ equation indicates use of the exclusive-OR logical operator, which is well-known to those skilled in the art.

Alternatively, an n-bit gray number-signal code in accordance with the present invention can be produced from a conventional gray code according to the following equations:

$$A_m = G_{2m+1} \text{ for } 0 \leq m \leq n/2$$

$$A_m = G_{2(n-1-m)} \text{ for } n/2 < m \leq n-1$$

where, when n is odd, n/2 refers to the integer portion of the quotient.

Figure 5:
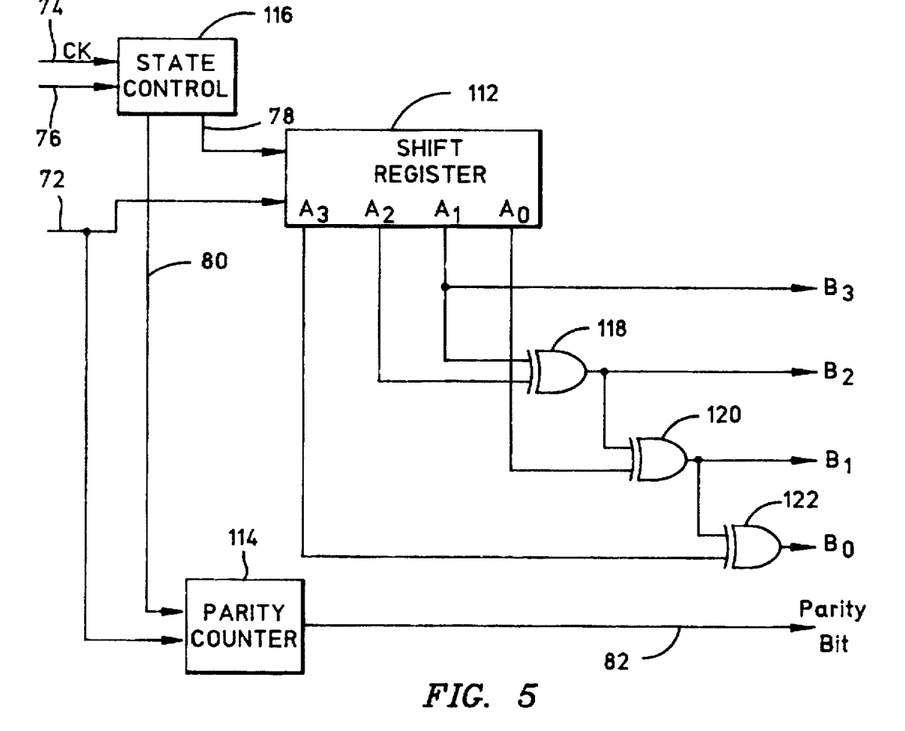
FIG. 5 is a diagram of the servo decoder illustrated in FIG. 1.
Figure 6:
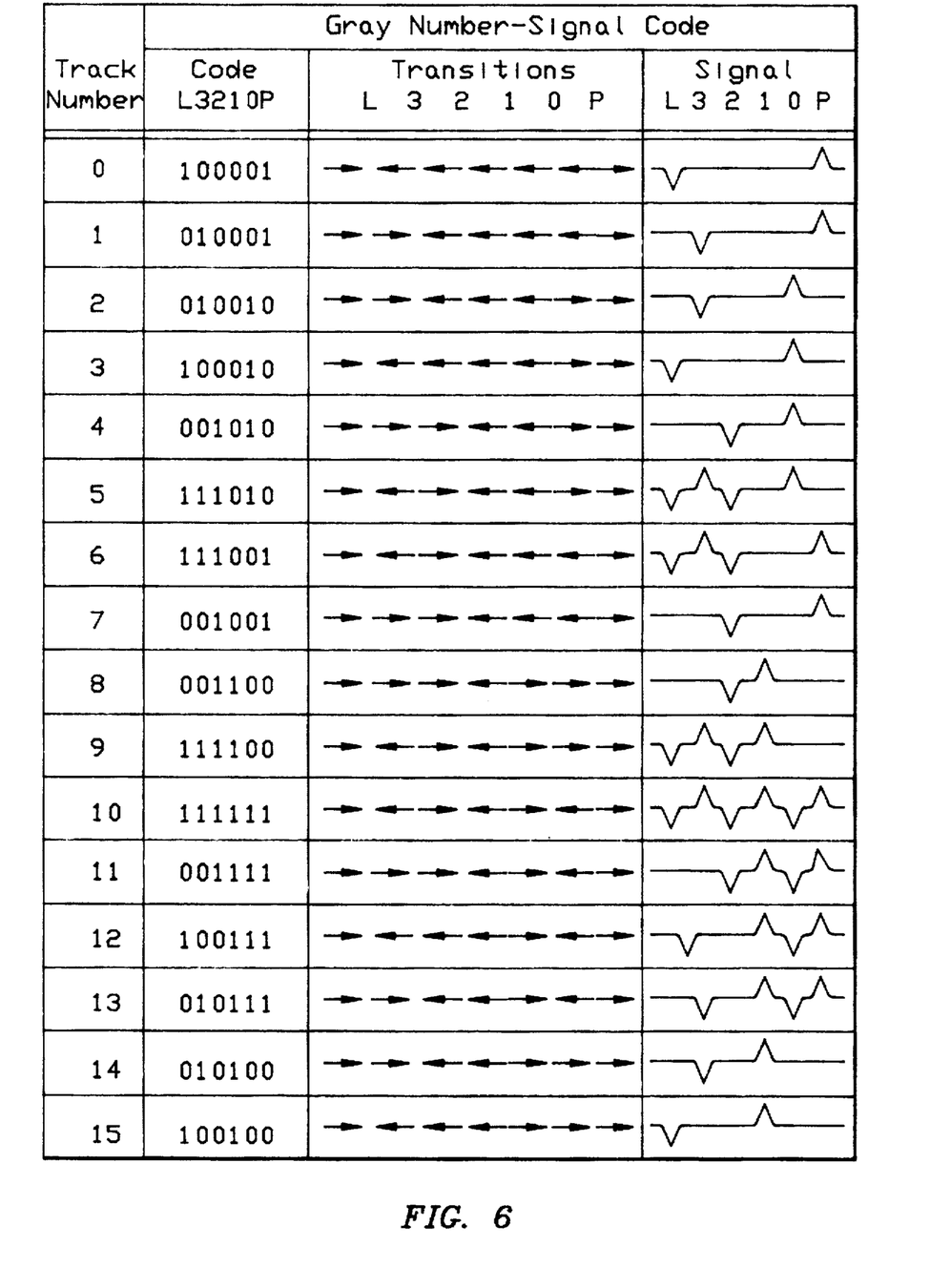
FIG. 6 is a table of particular track identification numbers and corresponding encoded values with parity and observed signals as read from the disk 12 and decoded by the servo decoder 70 as illustrated in FIG. 1.

FIG. 5 shows the construction of the servo decoder 20 of the channel chip 18. The state control circuit 116 controls the operation of the shift register 112 and the parity counter 114, and determines when the decoding process should be started and stopped. The circuit receives a system clock signal CK over a clock line 74 and receives a start signal over a line 76. The start signal is generated in response to data and timing information contained in the servo information, such as the detection of the servo address mark 104. The start signal produces a control output 78 for the shift register 112 and a control output 80 for the parity counter 114. As noted above, the leading pad bit is not decoded to produce the track identification number. The remaining four bits of the track identification number are received over the decode input line 72 into the shift register 112 in response to the control output 78. For example, the control output 78 could be a gating of the clock signal 74 to allow only the four code bits into the shift register. The track identification number data 72 is also provided to the parity counter circuit 114. Parity is provided by introducing a trailing pad transition of fixed orientation, which also preserves the magnetic polarity following the gray number-signal code. This is illustrated in FIG. 6. Parity is computed using all the gray number-signal code bits, including the leading pad bit and the trailing parity bit. The parity counter circuit 114 receives the control input 80 from the state control 116 to permit only the above-described bits into the parity counter. For example, the control 80 could be a gating of the clock signal 74. The parity counter circuit 114 performs a parity check function that is well-known to those skilled in the art and requires no further explanation.

The output of the shift register 112 is provided to a bank of exclusive-OR gates from which the track identification number is produced. The shift register 112 outputs A3, A2, A1, and A0 correspond to the gray number-signal code bits 3, 2, 1, and 0 respectively. More particularly, the shift register output $A_3, A_2, A_1, A_0$ is provided such that the $A_1$ bit corresponds to the $B_3$ bit of the track identification number. The $A_2$ shift register output and the $A_1$ output are provided as inputs to an exclusive-OR gate 118, whose output corresponds to the $B_2$ bit of the track identification number. The shift register $A_0$ output is combined with the output of the first exclusive-OR gate 118 in a second exclusive-OR gate 120, whose output corresponds to the $B_1$ bit of the track identification value. Finally, the $A_3$ output is combined with the output from the second exclusive-OR gate 120 in a third exclusive-OR gate 122 to produce the $B_0$ bit of the track identification number. The parity bit produced by the parity counter 114 is used to provide a parity check on the gray number-signal code.

FIG. 6 is a table that illustrates the addition of parity information to the encodement scheme shown in FIG. 3. The columns "Code", "Transitions", and "Signal" correspond to the same-named columns in FIG. 3. Each of these columns has an additional sub-heading "P", indicating the parity bit. It can be seen from the "Code" column that the illustrated parity is even, that is, that there is an even number of 1's in each code pattern. The "Transitions" column shows that the magnetic polarity of the parity bit is fixed, thus providing a constant magnetic polarity for any following information. The value of the parity bit is chosen based on the leading pad bit and the code bit values, and may be computed by methods well-known to those skilled in the art.

The parity information is particularly useful for on-track decoding of the servo information field. That is, parity is useful for the track following operation. Because the gray number-signal code in accordance with the present invention permits a relatively short length gray code encodement scheme in which n plus two bits are required for an n-bit gray code rather than 2 n bits, the gray number-signal code in accordance with the present invention can be used in conjunction with a variety of parity information schemes that otherwise would not be compatible. See, for example, U.S. Pat. No. 5,369,535 to S. Hetzler entitled "Fixed Block Architecture Disk File with Improved Position Identification and Error Handling", assigned to the assignee of the present application and incorporated herein by this reference.

Figure 7:
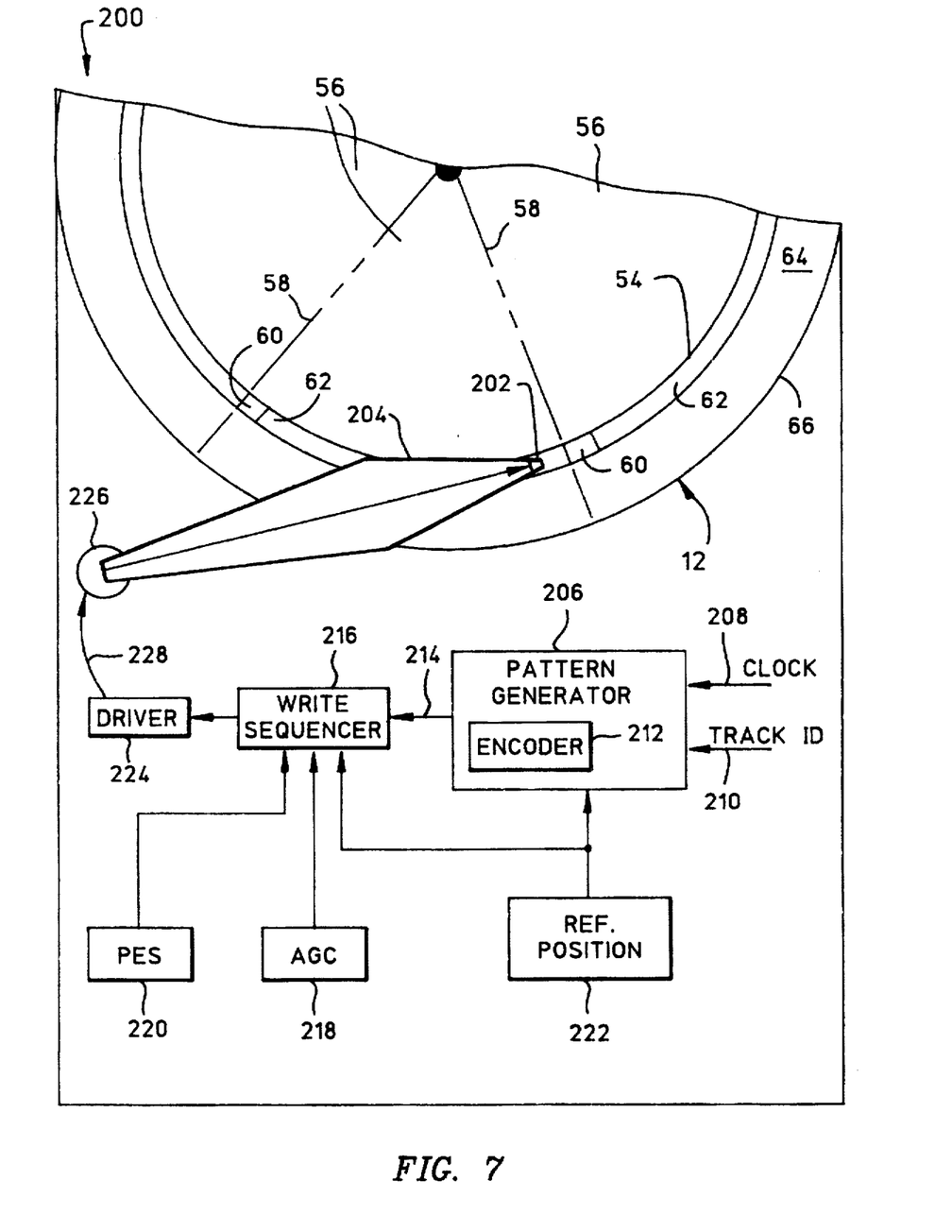
FIG. 7 is a schematic representation and block diagram of a disk drive track identification number encodement system constructed in accordance with the present invention.

FIG. 7 shows a track identification number encodement system 200 that encodes track identification numbers in the gray number-signal code described above. In FIG. 7, a disk 12 onto which the track identification numbers are to be recorded is illustrated. One track 54 of the disk is shown, divided into sectors 56 such that each sector in a track includes a servo information field 60 and a data field 62. The track identification numbers are recorded into the servo information fields by a servo write head 202 suspended over the disk 12 by a servo arm 204.

A pattern generator 206 of the encodement system 200 receives a clock signal from a clock input line 208 and receives the track identification number to be encoded over a track ID line 210. The pattern generator includes an encoder circuit 212 that generates the desired bit patterns comprising the gray number-signal code described above. The encoder can be implemented as a look-up table that retrieves appropriate data comprising bit patterns as a function of the received track ID or can comprise circuitry that generates the appropriate bit patterns as a function of the track ID. The encoded track identification number is provided from the pattern generator over a track ID output line 214 to a write sequencer 216 that prepares the data to be written into the servo information fields 52 of the disk 12. Thus, the write sequencer also receives the AGC block information and PES block information from a respective AGC block 218 and PES block 220. The address mark information is obtained by the write sequencer from a reference position generator 222, which produces a servo head position signal that indicates the position of the servo write head 202 over the disk 12.

The write sequencer 216 provides the servo information field data to a driver 224 that comprises a servo driver and write head controller. Thus, the driver provides servo control signals and write head signals to a servo 226 and to the write head 202, respectively, over an output line 228. In this way, the properly encoded track identification numbers are recorded in the tracks across the disk 12.

Figure 8:
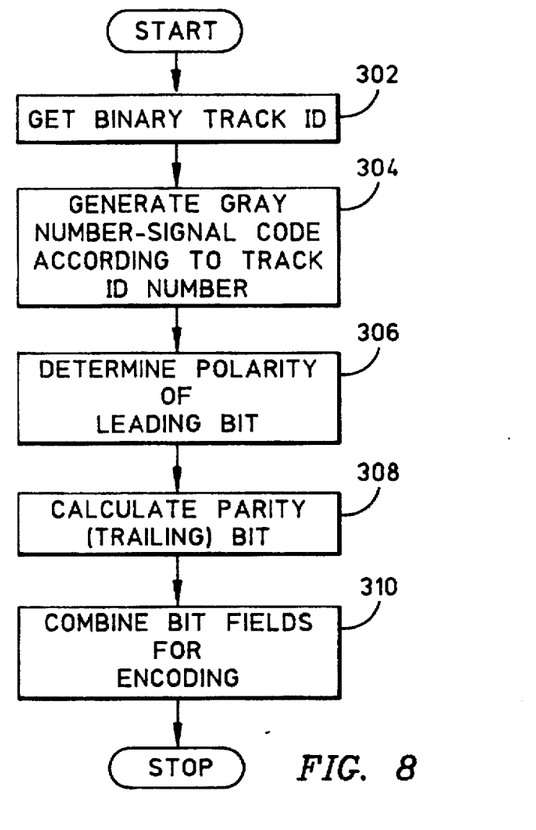
FIG. 8 is flow diagram illustrating the processing steps followed by the encodement system illustrated in FIG. 7.

FIG. 8 is a flow diagram of the processing steps carried out by the track identification encodement system illustrated in FIG. 7. In the first step of recording the track identification numbers, the system obtains the binary track identification number, as represented by the flow diagram box numbered 302. Next, the equivalent gray number-signal code is generated in accordance with the track ID, as represented by the flow diagram box numbered 304. The next step, indicated by the flow diagram box numbered 306, is to determine the leading bit polarity. As described above, this step comprises changing the polarity of the leading pad bit as necessary to maintain the magnetization of the following flux transitions from the previous encoded number. In the next step, represented by the flow diagram box numbered 308, a trailing bit comprising a parity value is calculated from the values of the gray number-signal code bits and the leading pad bit. This step is optional. Lastly, in the flow diagram box numbered 310, the bits for the various blocks of the servo information field are combined for encoding. These steps are repeated each time a track identification number is to be encoded onto the disk.

To obtain greater efficiency, the number of track identification number bits recorded on the disk can be reduced by splitting the track identification number into three or more fields. For example, if track identification numbers are to be recorded according to a 6-bit code, then the track identification numbers may be split into three fields of two bits each. In such a case, the two most significant bits comprise a high order field, the two least significant bits comprise a low order field, and the remaining two bits comprise a middle order field. Only four bits are then used to record the track identification information. In particular, the low order bits are recorded in every track of the disk and the remaining two bits of the track identification information alternate between the high order bits and the middle order bits. Thus, in one sector, the four bits of track identification information will comprise the two middle order bits and the two low order bits. In the next sector, the track identification information will comprise the two high order bits and the two low order bits. The track identification information will continue to alternate in this way, sector by sector, around the disk. To obtain the complete track identification number, it will then be necessary to read two consecutive servo sector fields. In the case of track following, only the low order track identification number bits are required.

After each servo field is read and decoded, the servo controller 22 predicts what the head position will be when the next servo field spins under the read head. The difference between the predicted position and the actual measured position is the error in the position estimate. The largest expected error that will be seen under normal operation depends on the control system and the disk drive configuration and is determined during the development of the drive. The servo controller 22 can use the position estimate and the decoded low order bits of the track number to overcome the uncertainty in the position caused by the largest expected error in the position estimate.

In accordance with the invention, the size of the low order bit field is selected so as to provide a sufficient number of digits to identify the associated track within the largest expected error in the position estimate of the head/arm assembly of the disk drive 10. That is, the larger the maximum expected error of the servo estimator, the greater the number of low order bits necessary to identify the track. In this way, track identification numbers can be encoded using a lesser number of bits. For example, a 12-bit track identification value can be stored using only eight bits.

When the track identification numbers are split into subfields comprising high, middle, and low order fields, the concatenation of the high order field and low order field will not necessarily behave as a true gray code. Therefore, if the high-medium-low encodement scheme described above is used, the concatenated field comprising the high order bits and low order bits is preferably recorded as a single gray number-signal code in accordance with the present invention. In this way, the gray code properties are maintained, along with the added efficiency of the reduced length code. Those skilled in the art will appreciate that the number must then be split apart into the respective high order and low order fields upon decoding the track identification number. Such processing should be readily apparent to those skilled in the art, in view of the description above, without further explanation.

Figure 9:
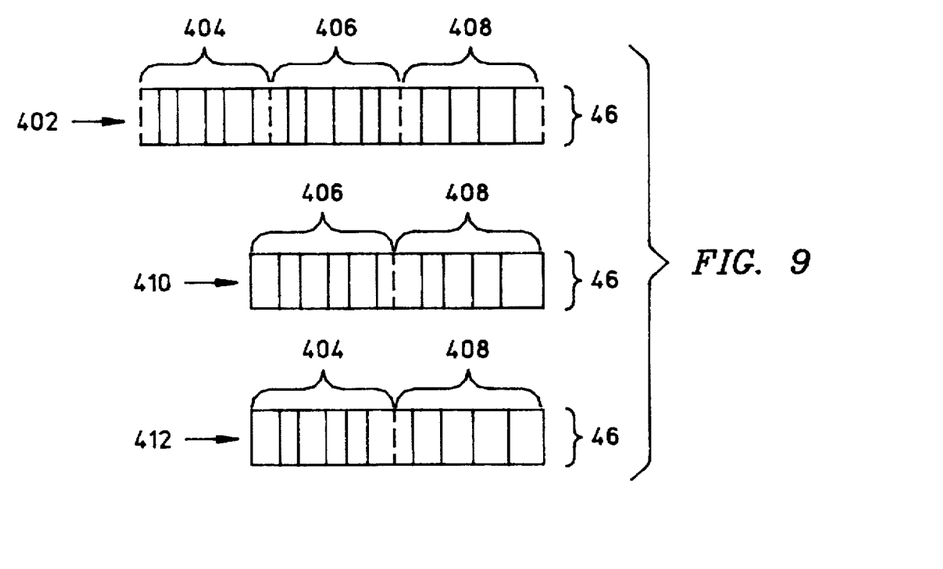
FIG. 9 is a representation of the track identification code used in the disk drive illustrated in FIG. 1 split into separate fields.

FIG. 9 illustrates the increased efficiency that can be obtained with the splitting of the track identification numbers. In FIG. 9, a 14-bit track identification code 402 recorded in a track 46 of the disk 12 is represented as comprising a high order field 404 containing the five most significant bits, a middle order field 406 containing the next five most significant bits, and a low order field 408 containing the four least significant bits. The magnetic flux transitions that comprise the encoded track identification number are represented as solid vertical lines for purposes of illustration. The dashed vertical lines represent the division between the various split fields, again for purposes of illustration only. The splitting of the track identification number into subfields permits use of two alternating 9-bit patterns, one pattern 410 including the middle order bits 406 and the low order bits 408 and the other pattern 412 including the high order bits 404 and the low order bits 408. The 9-bit track identification patterns 410, 412 are recorded in alternating sequence in respective servo information field sectors in a track 46 of the disk 12. It should be noted that the bit patterns in the fields 404, 406, 408 might change when this is done.

In some cases, it is desirable to encode the track identification number so as to provide a run length limited (RLL) number. With an RLL code, long strings of zeros in the code, which might interfere with the operation of a high pass filter, are avoided. The track identification encoding in accordance with the present invention can incorporate the RLL feature.

One way to obtain the RLL feature is for the pattern generator 206 of the encoding system illustrated in FIG. 7 to select the leading bit and trailing parity bit so as to limit the number of zeros in the code at the number of code digits. That is, the pattern generator selects the first and last bits of the encoded value for "zero" to be one.

Another way of obtaining the RLL feature is to split the encoded bits in track identification number into fields having a number of digits equal to the maximum desired length in view of the run length limit. The entire track identification number can then be obtained by concatenating the separate bit fields, in a process similar to that described above in conjunction with FIG. 9. Similarly, it might be necessary to encode two of the concatenated fields into an additional gray number-signal code value in accordance with the present invention.

Finally, the RLL feature can be obtained by a pattern generator 206 that picks a subsequence of a larger gray number-signal code in accordance with the present invention so as to obtain the desired run length limit. For example, if a 4-bit code (not including pad bit) is desired, then the equivalent encoded sequence for the numbers sixteen through thirty-one of a 5-bit gray number-signal code in accordance with the present invention can be used. When such encoded track identification numbers are decoded, the middle bit of the 5-bit sequence, which will always be a one for the values sixteen through thirty-one, can be ignored and the code values received from decoding can be read in inverse order. That is, the 5-bit value for thirty-one, "00100", has the value "0000" without the middle bit, which is track number zero. Similarly, the 5-bit value for sixteen, "00110", has the value "0010" without the middle bit, which is track number fifteen. Track identification numbers encoded in this way are easily decoded into the appropriate values.

The track identification number encodement scheme recorded in the servo information fields of the disk and the disk servo control and disk encodement recording systems described above provide track identification numbers of three or more bits that can record n-bit gray code numbers using only n+1 bits while preserving the gray code property of only a single digit changing between consecutive code sequence numbers for both the numerical values and the electrical signals produced by a servo read head (or n+2 if parity is added). Such benefits, along with the flexibility provided by splitting the track identification numbers into subfields and providing a run length limit feature, have wide applicability to disk drive storage systems.

The present invention has been described above in terms of a presently preferred embodiment so that an understanding of the present invention can be conveyed. There are, however, many configurations for storage media not specifically described herein but with which the present invention is applicable. The present invention should therefore not be seen as limited to the particular embodiment described herein, but rather, it should be understood that the present invention has wide applicability with respect to storage media generally. For example, the present invention can be applied to capacitive and optical transition sensing storage systems. All modifications, variations, or equivalent arrangements that are within the scope of the attached claims should therefore be considered to be within the scope of the invention.

We claim:

1. A servo controller for controlling the position of a head assembly adjacent the surface of a magnetic storage medium that reads magnetic flux transitions recorded in servo information fields of a plurality of tracks in the magnetic storage medium and produces a readback signal, the magnetic flux transitions having predetermined polarities that define a binary track identification number that indicates the track, the servo control system including:

a servo assembly that moves the head assembly relative to the tracks of the magnetic storage medium;

a detection circuit that receives the readback signal from the head assembly and detects servo information in the readback signal; and a servo decoder that receives the servo information and decodes the servo information from the head assembly, wherein the servo information comprises a sequence of signal components that define a transition pattern that corresponds to the track identification number such that one magnetic flux transition defines a bit of the track identification number, only one bit of the track identification number changes from one track to the next, and only one signal component transition of the servo information changes from one track to the next.

2. A servo controller as defined in claim 1, wherein the sequence of magnetic flux transitions recorded in the servo information field further includes a leading transition defining a pad bit whose polarity is selected to preserve the respective polarities of the magnetic flux transitions as the track identification numbers change in accordance with the predetermined polarities.

3. A servo controller as defined in claim 2, wherein the track identification numbers correspond to encoded numbers defined by encoding rules wherein, between any two consecutive encoded track identification numbers, a zero may be changed to a one if no lesser significant bit is a one, a one may be changed to a zero if no lesser significant bit is a one, a zero may be changed to a one if no greater significant bit is a one, and the sign of the pad bit is reversed, and a one may be changed to a zero if no greater significant bit is a one, and the sign of the pad bit is reversed.

4. A servo controller as defined in claim 3, wherein:

each track of the storage disk is divided into a plurality of sectors having a predetermined length;

the track identification numbers are split into multiple subfields including a predetermined number of least significant bits comprising a low-order field and a plurality of higher-order fields that together comprise the remaining bits of the track identification number, wherein the servo information field of each track sector includes a split track identification number comprising the concatenation of the low-order field and one of the higher-order fields.

5. A servo controller as defined in claim 4, wherein the number of bits in the low-order field comprises a number of bits sufficient to identify a track within the maximum estimated error of the head assembly in moving from one track to another.

6. A servo controller as defined in claim 4, wherein the number of bits in each of the subfields is equal.

7. A servo controller as defined in claim 4, wherein the split track identification numbers correspond to encoded numbers defined by encoding rules wherein, between any two consecutive encoded numbers, a zero may be changed to a one if no lesser significant bit is a one, a one may be changed to a zero if no lesser significant bit is a one, a zero may be changed to a one if no greater significant bit is a one, and the sign of the pad bit is reversed, and a one may be changed to a zero if no greater significant bit is a one, and the sign of the pad bit is reversed.

8. A servo controller as defined in claim 4, wherein the encoded track identification numbers are split into multiple subfields so that the concatenated bit fields have a predetermined number of bits equal to a desired run-length-limit number of bits.

9. A servo controller as defined in claim 3, wherein the sequence of magnetic flux transitions recorded in the servo information field further includes a trailing transition defining a parity bit whose polarity is selected in accordance with a parity rule, and further includes a parity counter circuit that determines the parity from the sequence of transitions, including the leading pad transition.

10. A servo controller as defined in claim 9, wherein the parity rule is even parity.

11. A servo controller as defined in claim 10, wherein the leading pad bit is defined to have a binary value of 1 for the encoded track identification number of 0, thereby providing a run-length limit for the servo information field.

12. A servo controller as defined in claim 3, wherein the encoded track identification numbers comprise a code having a bit length equal to a predetermined number n−1 that is constructed from a code having a bit length equal to the number n with a middle bit of the n-bit code always set to the binary value one, thereby providing a run-length-limit for the servo information field.

* * * * *